(12) United States Patent
Fries et al.

(10) Patent No.: US 11,394,747 B2
(45) Date of Patent: Jul. 19, 2022

(54) METHOD FOR SETTING UP A COMMUNICATION CHANNEL BETWEEN A SERVER DEVICE AND A CLIENT DEVICE

(71) Applicant: Siemens Aktiengesellschaft, Munich (DE)

(72) Inventors: Steffen Fries, Baldham (DE); Rainer Falk, Poing (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 120 days.

(21) Appl. No.: 16/038,558

(22) Filed: Jul. 18, 2018

(65) Prior Publication Data

US 2019/0028459 A1 Jan. 24, 2019

(30) Foreign Application Priority Data

Jul. 20, 2017 (EP) .................................. 17182325

(51) Int. Cl.
*H04L 9/40* (2022.01)
*G06F 21/33* (2013.01)
(Continued)

(52) U.S. Cl.
CPC ............ *H04L 63/166* (2013.01); *G06F 21/33* (2013.01); *H04L 63/0807* (2013.01);
(Continued)

(58) Field of Classification Search
CPC ... H04L 63/166; H04L 63/0807; H04L 67/02; H04L 63/0823; H04L 67/141; H04L 63/083; G06F 21/33
See application file for complete search history.

(56) References Cited

U.S. PATENT DOCUMENTS

| 8,819,794 | B2 * | 8/2014 | Eydelman | ........... H04L 63/0823 726/6 |
| 2010/0049970 | A1 * | 2/2010 | Fraleigh | ............. H04L 63/0823 713/156 |

(Continued)

OTHER PUBLICATIONS

IETF RFC 5246, Aug. 2008., The Transport Layer Security (TLS) Protocol Version 1.2. (Year: 2008).*

(Continued)

*Primary Examiner* — Robert B Leung
*Assistant Examiner* — Bruce S Ashley
(74) *Attorney, Agent, or Firm* — Schmeiser, Olsen & Watts LLP

(57) ABSTRACT

A method for setting up a communication channel for exchanging data between a server device and a client device is provided. The method includes: transmitting authentication information from an issuer device to the client device; transmitting the authentication information from the client device to the server device in a cryptographic security protocol, in particular in a TLS handshake protocol; authenticating the client device by means of the server device depending on the received authentication information; and setting up the communication channel between the server device and the authenticated client device by means of the cryptographic security protocol. The authentication of the client device can be carried out in the context of setting up the communication channel. In this case, the communication channel is established by means of the cryptographic security protocol.

11 Claims, 4 Drawing Sheets

(51) Int. Cl.
*H04L 67/02* (2022.01)
*H04L 67/141* (2022.01)

(52) U.S. Cl.
CPC .......... *H04L 63/0823* (2013.01); *H04L 67/02* (2013.01); *H04L 67/141* (2013.01)

(56) References Cited

U.S. PATENT DOCUMENTS

2014/0282957 A1    9/2014   Thakore et al.
2017/0012778 A1*   1/2017   Choyi ................. H04L 9/14
2017/0302656 A1*  10/2017   Ramatchandirane .......................
                                                              H04L 63/0869

OTHER PUBLICATIONS

IETF RFC 7523, May 2015, JSON Web Token (JWT) Profile for OAuth 2.0 Client Authentication and Authorization Grants (Year: 2015).*

JSON Web Token Introduction, Jun. 29, 2017, Wayback Machine jwt.io, p. 2 (Year: 2017).*

Anonymous: "X.509—Wikipedia", XP055431450, Internet: URL:https://en.wikipedia.org/w/index.php?title=X.509&oldid=788233660, retrieved Dec. 4, 2017, pp. 1-4; 2010.

Brown M et al: "Transport Layer Security (TLS) Authorization Extensions", rfc5878.txt, ISSN: 2070-1721, Internet Engineering Task Force, IETF, Standard, Internet Society (ISOC) 4, Rue Des Falaises CH-1205 Geneva, Switzerland, pp. 1-19, XP015070793, gefunden am May 6, 2010, figure 1, pp. 2-4; 2010; http://www.rfc-editor.org/pdfrfc/rfc5878.txt.pdf.

Jones M et al: "JSON Web Token (JWT)", rfc7519.txt11, Internet Engineering Task Force, IETF, Standard, Internet Society (ISOC) 4, ISSN:2070-1721, Rue Des Falaises CH-1205 Geneva, Switzerland, pp. 1-30, XP015106168, gefunden am May 20, 2015, Appendix B, pp. 28-29; 2015; http://www.rfc-editor.org/pdfrfc/rfc7519.txt.pdf.

Request for Comments, RFC 5246; http://www.rfc-editor.org/pdfrfc/rfc5246.txt.pdf; 2008.

Standard IEEE 802.11—Wireless LAN Medium Access Control (MAC) and Physical Layer (PHY) Specifications; IEEE Standard for Information technology—Telecommunications and information exchange between systems—Local and metropolitan area networks—Specific requirements; 802.11; Jun. 12, 2007; 2007.

IEEE Standard 802.16—2004; Air Interface for Fixed Broadband Wireless Access Systems, 2004.

* cited by examiner

METHOD FOR SETTING UP A COMMUNICATION CHANNEL BETWEEN A SERVER DEVICE AND A CLIENT DEVICE

CROSS-REFERENCE TO RELATED APPLICATIONS

This application claims priority to European application No. EP17182325 having a filing date of Jul. 20, 2017, the entire contents of both of which are hereby incorporated by reference.

FIELD OF TECHNOLOGY

The following relates to a method for setting up a communication channel for exchanging data between a server device and a client device.

BACKGROUND

In order that data can be exchanged between a client device, such as e.g. an Internet of Things (IoT) device, and a server device, such as e.g. an Internet server, it may be necessary to set up a communication channel or to set up a connection between the client device and the server device. Setting up the communication channel often comprises an authentication of the client device at the server device.

It is known for the client device to authenticate itself by authentication information provided to said client device by an issuer device. The authentication is often carried out separately from the connection set-up between the client device and the server device. There is a need for an improved authentication that is part of the connection set-up between the client device and the server device.

SUMMARY

An aspect relates to providing an improved method for setting up a communication channel for exchanging data between a server device and a client device.

Accordingly, a method for setting up a communication channel for exchanging data between a server device and a client device as claimed in claim 1 is proposed.

The method can furthermore comprise:

authenticating the client device by means of an issuer device;

requesting authentication information for the client device by means of the client device from the issuer device;

transmitting the authentication information by means of the issuer device to the client device;

transmitting the authentication information from the client device to the server device in a cryptographic security protocol, in particular in a TLS handshake protocol;

authenticating the client device by means of the server device depending on the received authentication information; and setting up the communication channel between the server device and the authenticated client device by means of the cryptographic security protocol.

The server device, hereinafter also called "server", is in particular a device or a program which can be accessed by the client device, hereinafter also called "client". The client device can be for example an IoT device or a field device or else the computer of a service technician. The server device can be for example an Internet server or a computer or likewise a field device.

Setting up the communication channel between the server device and the client device may necessitate an authentication of the client device at the server device. Said authentication can be carried out in accordance with the cryptographic security protocol. For authenticating the client device, the server device may require authentication information of the client device. For this purpose, the server device can request the authentication information at the client device. The authentication information can comprise client-specific information.

An authentication is understood to mean, in particular, proof of the identity of a person and/or of a device. The authentication presents in particular the proof of a device (or person) that said device (or person) is actually the device (or person) that said device (or person) professes to be. The authentication information can accordingly be information by which the identity of the client device can be proved.

The authentication should be differentiated in particular from an authorization. The authorization usually concerns the granting of an access right. A successful check of an authentication in particular still does not mean that an authorization is successful too. The authentication information is in particular not authorization information.

The authentication information can be e.g. a digital certificate or a token, in particular a Simple Web Token (SWT), a Security Assertion Markup Language Token (SAML) or a JSON Web Token (JWT).

In embodiments, the authentication information is created by the issuer device and/or provided to the client device. The issuer device can be an identity management device which, upon enquiry by a client device, creates authentication information for the enquiring client device. The issuer device can be part of the server device or a separate/individual server. The issuer device can furthermore be realized as a cloud-based service and be embodied for example on a cloud platform. Furthermore, infrastructures such as OpenID or OAuth can be used as issuer devices.

The server device can make a request of the client device by means of the cryptographic security protocol via a network for the transmission of the authentication information. In embodiments, for this purpose the method comprises requesting the authentication information for the client device by means of the server device by way of the cryptographic security protocol from the client device. The server device can send the client device, e.g. by means of the cryptographic security protocol, an enquiry for requesting the authentication information. Said enquiry can stipulate one or more issuer devices. The client device can also provide the server device with the authentication information of its own accord, that is to say without the server device having to explicitly ask for the authentication information.

The client device can transmit the authentication information created by the issuer device to the server device. In this case, the transmission of the authentication information from the client device to the server device is carried out in particular by means of the cryptographic security protocol.

The cryptographic security protocol that uses the authentication information can be a cryptographically secure network authentication protocol defined e.g. by IEEE 802.1X, IEEE 802.11 (WLAN), IEEE 802.16 (WiMAX), or else be used in the context of a specific security protocol such as e.g. IPsec with IKEv2 or else TLS.

The cryptographic security protocol is in particular a protocol which is usable for authenticating the client device at the server device and for determining keys, for example in a key agreement between the client device and the server device.

The authentication information received by the server device is used in particular by the server device to authenticate the client device. On the basis of the received authentication information the server device can check whether the client device is reliable and determine whether the set-up of the communication channel ought to be permitted in regard to security. The checking of the authentication information by the server device can also be regarded as authenticating, wherein authenticating generally corresponds to a check of an asserted authentication.

Allowing the authentication information to be issued by the issuer device is particularly advantageous because the server device need not know all individual client devices and need not know which client devices are reliable. Instead, it is sufficient if the server devices can estimate the reliability of the issuer device. Since fewer issuer devices than client devices are usually present, less permissibility information has to be stored in the storage device, as a result of which it is possible to save memory space in the server device. Furthermore, client devices which themselves cannot create authentication information can be authenticated. This is applicable in particular to client devices which e.g. have only limited functionality or possibly have no certificates for authentication at a server.

If the authentication has been successfully concluded, it is possible to establish the communication channel between the server device and the authenticated client device by means of the predetermined protocol. The server device and the client device can securely exchange data in particular via the communication channel.

The authentication of the client device can be carried out by means of the cryptographic security protocol. Furthermore, the authentication can be part of the set-up of the communication channel between the client device and the server device.

In this case, the authentication of the client device can be carried out in the same cryptographic security protocol as an authentication of the server device, such that no discontinuity between the OSI layers ("Open System Interconnection") arises with regard to the authentication.

Furthermore, communication services, for example HTTPS, via the secure communication channel can utilize the security of the channel, without themselves having to integrate security functions. The security can substantially be realized by means of the TLS protocol.

In embodiments, the method described above and below comprises at least one of the following steps:
authenticating the client device by means of the issuer device;
requesting the authentication information for the client device by means of the client device from the issuer device; and/or
transmitting the authentication information by means of the issuer device to the client device.

In accordance with one embodiment, the cryptographic security protocol is a protocol from the internet protocol family. The internet protocol family comprises network protocols that form the basis for network communication on the internet.

Examples of cryptographic security protocols include IEEE 802.1X, IEEE 802.11 (WLAN), IEEE 802.16 (WiMax), IPsec (internet protocol security), IKEv2 (internet key exchange), etc.

In accordance with a further embodiment, the cryptographic security protocol is a protocol for the transport layer, in particular a TLS protocol.

"TLS" stands for "Transport Layer Security". The client device can be a TLS client and the server device can be a TLS server. In particular, the cryptographic security protocol corresponds to the TLS internet standard RFC 5246.

In embodiments, the authentication of the client device is not carried out by means of the routinely used HTTP protocol, but rather directly in an underlying protocol layer, in particular in the transport layer.

In accordance with a further embodiment, the method is part of a TLS handshake between the client device and the server device. The TLS handshake is an authentication and key agreement protocol that is implemented by means of the TLS protocol. The TLS handshake can serve for connection set-up between the client device and the server device.

In environments, the client device can transmit the authentication information to the server device during the authentication and key agreement protocol, in particular during the TLS handshake, via a TLS connection effected in the connection set-up.

In accordance with a further embodiment, the authentication information is a JSON Web Token. A JSON Web Token is a JSON-based token which is standardized according to RFC 7519 and which describes claims as JSON objects. JSON Web Tokens serve in particular for secure data transmission between the client device and the server device.

Using a JSON Web Token as the authentication information is advantageous because JSON Web Tokens are particularly compact. Furthermore, they enable secure data transmission on the basis of digital signatures and/or cryptographic keys.

An authentication protocol, in particular, the TLS handshake protocol, can be extended, such that a JSON Web Token (JWT) can be transmitted from a client device to a server device in the context of a TLS connection set-up.

In the authentication variant for the TLS protocol, the client device can authenticate itself via the JWT directly within the TLS protocol. In embodiments, the TLS handshake is extended in such a way that it additionally supports the JWT format as a new authentication option.

In embodiments, a TLS extension for the TLS protocol is proposed which enables transport of JSON Web-Tokens within the TLS protocol. In particular, an additional security token format is supported by TLS. The TLS extension extends in particular RFC 5878 in this respect. In the TLS extension, the JWTs can be transported directly and/or as a reference.

In embodiments, the JWT is used together with a known TLS client authentication using a cryptographic client key.

In accordance with a further embodiment, the authentication information is assigned an issuer device indicating an issuer of the authentication information.

The issuer device can be part of the authentication information or be present as a separate file. It indicates in particular which issuer device created the authentication information and/or transmitted it to the client device. The issuer information is for example a URL (uniform resource locator), a URI (uniform resource identifier), an IP address, etc.

The authentication protocol, in particular the TLS handshake protocol, can be extended, such that an issuer device is provided for the server device. An HTTP redirect, which is usually used in a JWT-based authentication and in which the client device is redirected to the issuer device, is not necessary.

The issuer device can be evaluated upon reception of the authentication information by the server device in order to determine which issuer device issued the authentication information.

In accordance with a further embodiment, the method furthermore comprises:

storing a permissibility list in the client device or in the server device, which permissibility list indicates which issuer device from a multiplicity of issuer devices can create authentication information that is permissible for authenticating the client device;

checking, in the client device or in the server device, whether the issuer device assigned to the authentication information is permissible in accordance with the permissibility list; and if the issuer device is permissible in accordance with the permissibility list, authenticating the client device by means of the server device on the basis of the authentication information.

The permissibility list contains in particular a list of issuer devices that can create authentication information deemed to be permissible by the storage device. The permissibility list can comprise the issuer device, for example the URI, of the permissible issuer devices.

The storage device can transmit the permissibility list to the client device, in particular by means of the predetermined protocol.

On the basis of the permissibility list, the client device can effect a preselection of the authentication information. By way of example, the client device accepts only authentication information which is deemed to be permissible in accordance with the permissibility list. The client device can also transmit to the server device only authentication information which is deemed to be permissible in accordance with the permissibility list.

The client device can furthermore select from a plurality of items of authentication information one which is permissible in regard to the permissibility list, and transmit it to the server device.

Authentication information which is not permitted in regard to the permissibility list in particular cannot be used for authenticating the client device.

The permissibility list can thus be used for checking the permissibility of authentication information. The permissibility list replaces the conventional HTTP redirect.

In accordance with a further embodiment, the authentication information contains a session information about the current connection between the client device and the server device. The session information can indicate a current session of the client device and the server device. It can be provided to the issuer device when issuing the authentication information by means of the client device. The client device can have obtained the session information beforehand from the server device. The server device can check the validity of the session information upon receiving the authentication information. In particular, the server device authenticates the client device only given valid session information.

In accordance with a further embodiment, the authentication information is assigned destination information indicating destination server device information for which the authentication token is intended.

In accordance with a further embodiment, the method furthermore comprises:

checking by the client device whether the destination server device information corresponds to the server device that asked for the authentication information; and if the destination server device information corresponds to the server device, transmitting the authentication information from the client device to the server device.

The destination server device information, also called destination information, is assigned to the authentication information for example by the issuer device. The destination information can be part of the authentication information or a separate file. The destination information can indicate vis-à-vis which server device the authentication information is usable.

On the basis of the destination information, the client device can select in particular that authentication information which is appropriate for the server device that requested the authentication information.

In accordance with a further embodiment, the method furthermore comprises:

selecting, in the client device, from a multiplicity of items of authentication information an item of authentication information which is assigned an issuer device permissible in accordance with the permissibility list and/or which is assigned destination server device information corresponding to the server device that communicated the enquiry to the client device; and transmitting the selected authentication information from the client device to the server device by means of the cryptographic security protocol In accordance with a further embodiment, the method furthermore comprises:

if the client device is not authenticated by the server device, blocking the set-up of the communication channel between the server device and the client device.

The communication channel is established in particular only if the client device was successfully authenticated by the server device. If the client device is not successfully authenticated, the set-up of the communication channel can be blocked and an error message can be output by the server device and/or the client device.

In accordance with a further embodiment, the method furthermore comprises:

transmitting client device-related information from the client device to the issuer device; and creating the authentication information taking account of the client device-related information in the issuer device.

On the basis of the client device-related information, client device-specific authentication information can be created by the issuer device.

In accordance with a further embodiment, the authentication information comprises at least one item of handling information (version, options) indicating indications for proper transmission and/or use of the authentication information. Transmitting the authentication information and/or authenticating the client device are/is carried out taking account of the handling information.

The handling information indicates for example with what protocol versions and options the authentication information can be used. If the authentication information is a JWT, the handling information can indicate the TLS protocol version (e.g. TLS1.2 or TLS1.3), the TLS Cipher Suites and the TLS options with which the JWT is usable.

In accordance with a further embodiment, the method furthermore comprises:

storing an issuer device list in the client device, which indicates the issuer devices from which the client device has valid authentication information and/or from which the client device can request authentication information.

The issuer device list can indicate the issuer devices from which the client device has valid authentication information and/or from which the client device can request authentication information, e.g. in the URL format. The issuer device list indicates in particular the issuer devices which are connected to the client device and/or at which the client device has authenticated itself.

In embodiments, the method furthermore comprises comparing the issuer device list with the permissibility list in the client device in order to determine or select at least one issuer device which is present both in the issuer device list and in the permissibility list. The authentication information of the selected issuer device can be transmitted in particular as selected authentication information for authenticating the client device to the server device.

Furthermore, in embodiments, the client device can communicate the issuer device list to the server device by means of the security protocol. The server device can then select from the received issuer device list an issuer device from which authentication information is desired.

Further possible implementations of embodiments of the invention also encompass combinations not explicitly mentioned of features or embodiments of the method described above or below in respect of the exemplary embodiments. In this case, the person skilled in the art will also add individual aspects as improvements or supplements to the respective basic form of the method.

BRIEF DESCRIPTION

Some of the embodiments will be described in detail, with reference to the following figures, wherein like designations denote like members, wherein.

In the figures, identical or functionally identical elements have been provided with the same reference signs, unless indicated otherwise.

DETAILED DESCRIPTION

Figure 1:
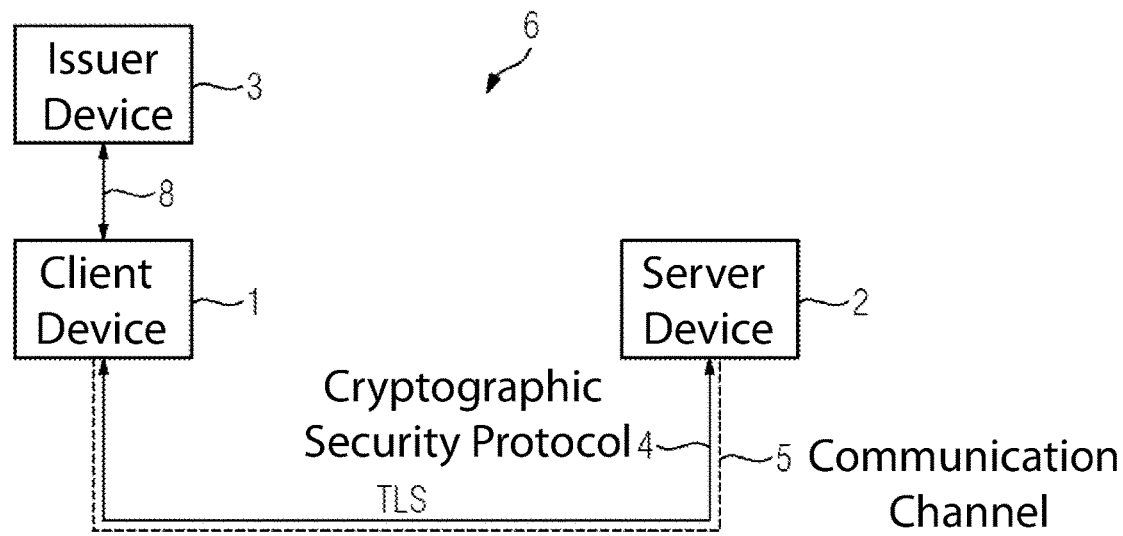
FIG. 1 shows a system in line with an embodiment for setting up a communication channel between a server device and a client device.

FIG. 1 shows a system 6 in line with an embodiment for setting up a communication channel 5 between a server device 2 and a client device 1. The system 6 comprises the client device 1, the server device 2 and an issuer device 3. The client device 1 is a field device for an automation network. The server device 2 is an IoT server and hereinafter is called "server".

For secure data transmission between the field device 1 and the server 2, it is necessary to set up the communication channel 5 between them. The set-up of the communication channel 5 is carried out on the basis of the method described in FIG. 2.

In an optional step S1, the server 2 requests the field device 1 to transmit authentication information to it. For this purpose, the server 2 sends an enquiry to the field device 1 by means of a cryptographic security protocol 4. In this case, the server 2 can make available a permissibility list of accepted issuer devices for authentication information, from which the field device 1 can choose.

The predetermined cryptographic security protocol 4 is a TLS protocol according to RFC 5246. The enquiry from the server 2 to the field device is part of a TLS handshake between the server 2 and the field device 1.

In a step S2, the issuer device 3 transmits the authentication information in accordance with the TLS protocol via a network connection 8 to the field device 1. The transmitted authentication information was created beforehand by the authentication device 3. The authentication information is a JSON Web Token (JWT). The JWT is allocated an issuer device that indicates the URL of the issuer of the JWT.

In a step S3, the field device 1 transmits the received authentication information to the server 2 by means of the TLS protocol 4.

A routine TLS protocol having authorization extensions according to RFC 5878, which is suitable according to embodiments of the invention for transmitting SAML Tokens, alongside X.509 certificates, can comprise the following definition as follows for implementation in widely used programming languages such as C or C++:

```
enum {
    x509_attr_cert(0), saml_assertion(1), x509_attr_cert_url(2),
    saml_assertion_url(3), (255)
} AuthzDataFormat;
AuthzDataFormats authz_format_list<1..2^8-1>;
```

The TLS protocol 4 used for setting up the communication channel 5 between the server 2 and the field device 1 comprises an extension for transmitting tokens in the JWT format. Said extension is contained in the definition of the TLS protocol 4 by way of the abovementioned authorization extensions. The authorization extension for the TLS protocol that is extended for transmitting tokens in the JWT format is defined as follows:

```
enum {
    x509_attr_cert(0), saml_assertion(1), x509_attr_cert_url(2),
    saml_assertion_url(3),
    jwt_claim(4), jwt_claim_url(5), (255)
} AuthzDataFormat;
```

The permissible data formats, which are usually defined as follows:

```
struct {
    AuthzDataFormat authz_format;
    select (AuthzDataFormat) {
        case x509_attr_cert: X509AttrCert;
        case saml_assertion: SAMLAssertion;
        case x509_attr_cert_url: URLandHash;
        case saml_assertion_url: URLandHash;
    }
} AuthorizationDataEntry;
``` also have to be extended to:

```
struct {
    AuthzDataFormat authz_format;
    select (AuthzDataFormat) {
        case x509_attr_cert: X509AttrCert;
        case saml_assertion: SAMLAssertion;
        case x509_attr_cert_url: URLandHash;
        case saml_assertion_url: URLandHash;
```

```
        case jwt_claim:            JwtClaim;
        case jwt_claim_url: URLandHash;
     }
  } AuthorizationDataEntry;
``` wherein JwtClaim is defined as follows:

JwtClaim OCTETSTRING.

The TLS protocol 4 thus comprises an extension for transmitting tokens in the JWT format. The transmission of the authentication information in the JWT format is thus carried out by means of the extended TLS protocol 4 in step S3.

In a step S4, the server 2 authenticates the field device 1 on the basis of the received authentication information. The field device 1 is authenticated only in the case of permissible authentication information. If the authentication information is permissible, the field device 1 is authenticated and the secure communication channel 5 is set up in a step S5.

The communication channel 5 enables data exchange between the server 2 and the field device 1 by means of the TLS protocol 4.

Figure 2:
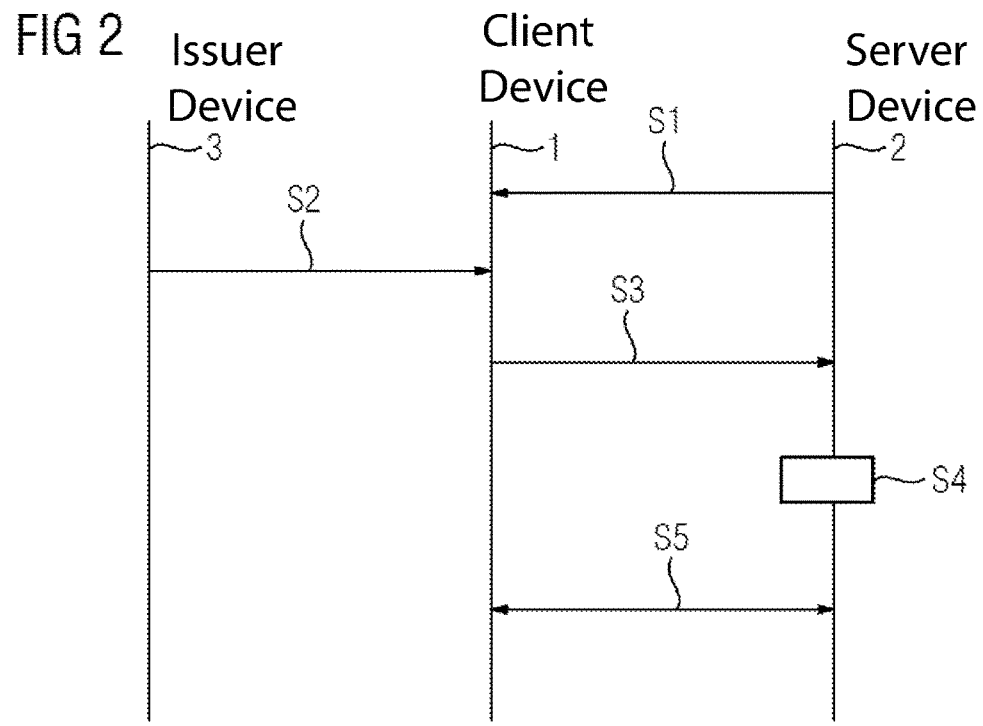
FIG. 2 shows a method for setting up a communication channel between a server device and a client device in accordance with a first embodiment.

Steps S1-S5 described with reference to FIG. 2 are all part of the TLS handshake between the server 2 and the field device 1. Advantageously, the authentication of the field device 1 vis-à-vis the server 2 can be part of the TLS handshake because the TLS protocol has been extended for transmitting tokens in the JWT format.

Figure 3:
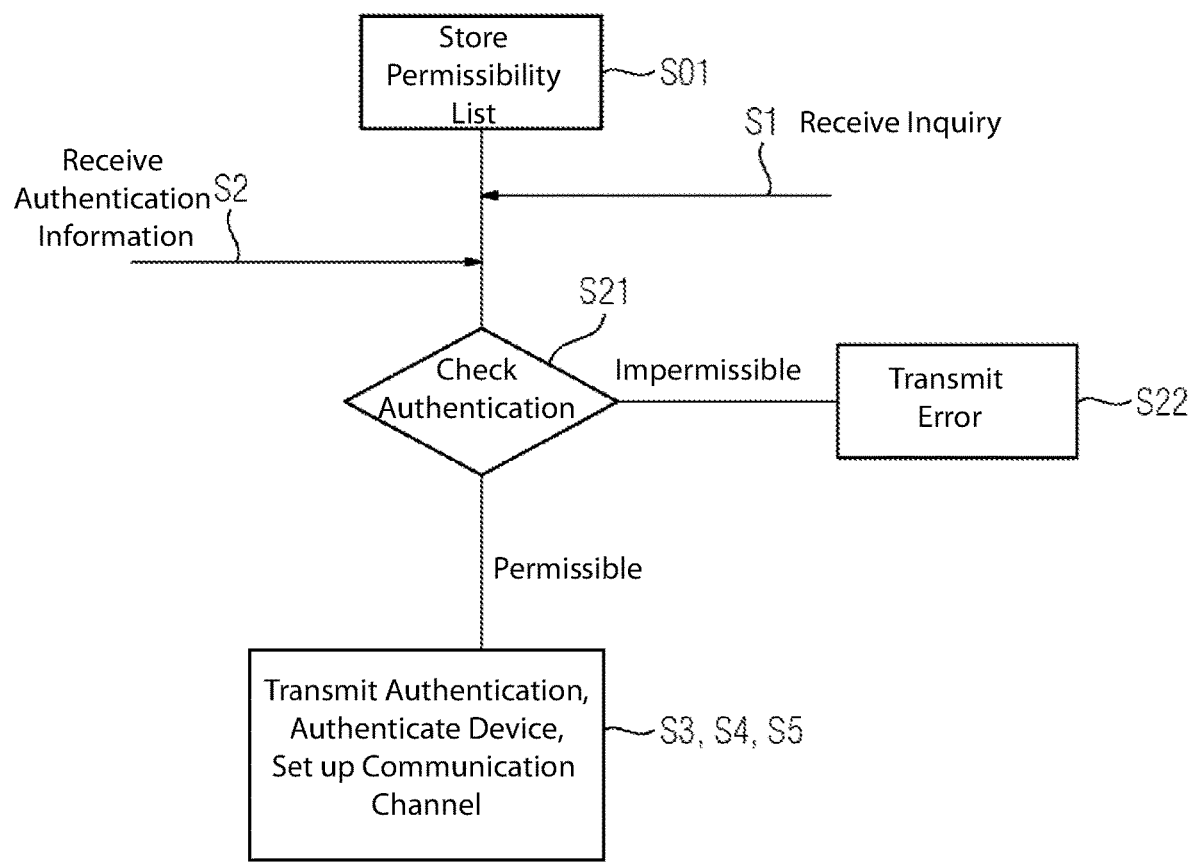
FIG. 3 shows a method for setting up a communication channel between a server device and a client device in accordance with a second embodiment.

FIG. 3 shows a method for setting up a communication channel between a server device and client device in accordance with a second embodiment. The method illustrated in FIG. 3 is an extension for the method from FIG. 2. The system 6 illustrated in FIG. 1 can carry out the method illustrated in FIG. 3.

In a step S01, a permissibility list is stored in the field device 1. The permissibility list is provided to the field device 1 by the server 2. The server 2 transmits the permissibility list by means of the TLS protocol 4. Alternatively, the permissibility list is defined on the field device by administration, depending on the security policy of the operator.

The permissibility list contains the URLs of all issuer devices which can issue permissible authentication information for the server 2.

In step S1, already described, the field device 1 receives the enquiry from the server 2. Furthermore, in step S2, already described, the field device 1 receives the authentication information from the issuer device 3, which comprises the URL of the issuer device 3 as assigned issuer device.

In a step S21, the field device 1 checks whether the authentication information received in step S2 is permissible in regard to the permissibility list of the server 2.

If the URL communicated with the authentication information is present in the permissibility list, the authentication information is determined to be permissible. In this case, steps S3, S4 and S5, already described, are carried out, in which the permitted authentication information is transmitted to the server 2, the server 2 authenticates the field device 1 and the communication channel 5 is set up.

If step S21 identifies that the URL communicated with the authentication information is not present in the permissibility list, the field device 1 determines that the authentication information is impermissible. In this case, in a step S22, the set-up of the communication channel 5 is blocked: the field device 1 sends no authentication information to the server 2.

Furthermore, the field device 1 is not authenticated either, and the communication channel 5 is not set up either. In step S22, the field device 1 transmits an error message to the server 2.

Figure 4:
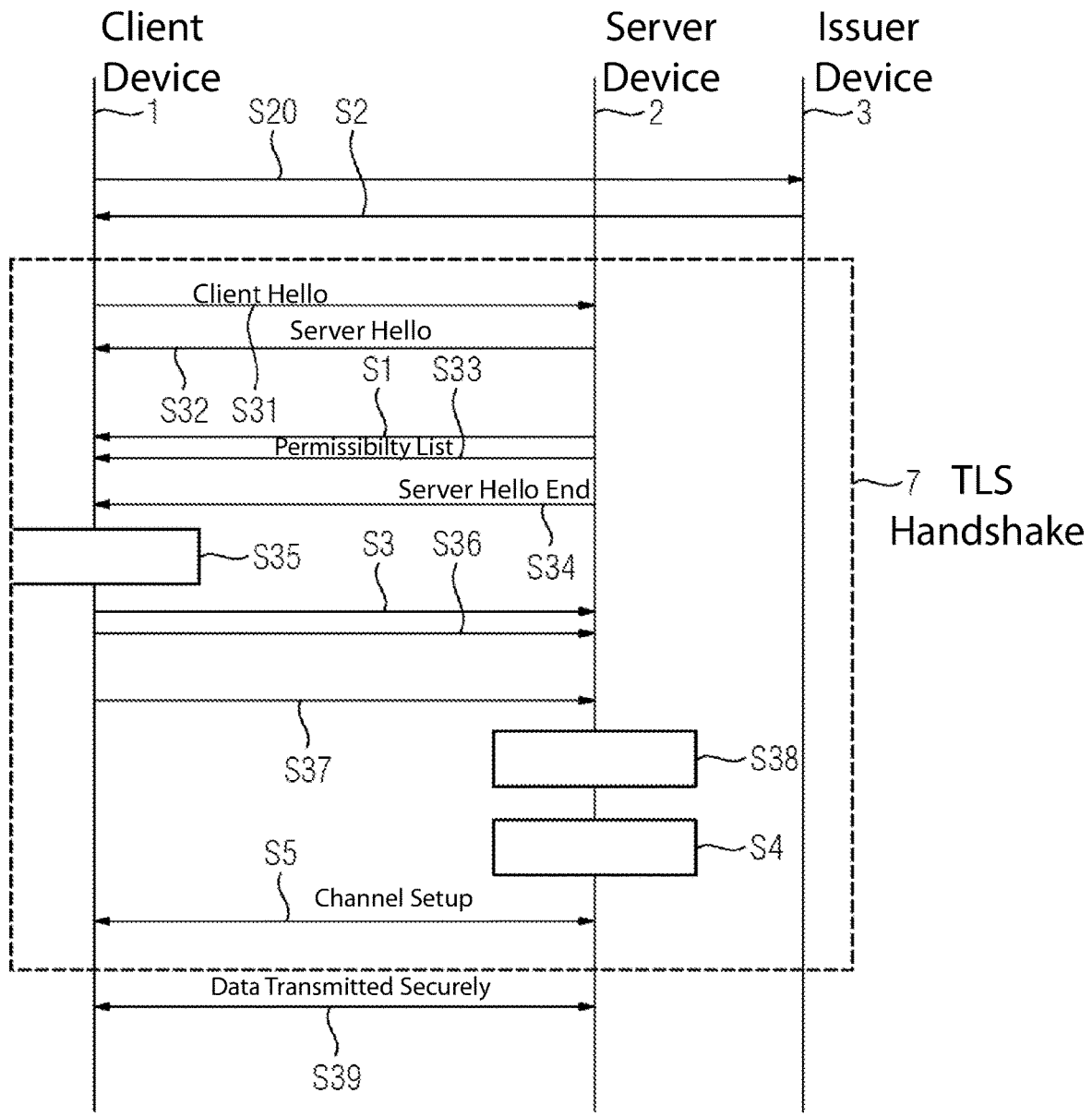
FIG. 4 shows a method for setting up a communication channel between a server device and a client device in accordance with a third embodiment.

FIG. 4 shows a method for setting up a communication channel between a server device and a client device in accordance with a third embodiment. The method illustrated in FIG. 4 is an extension for the method from FIG. 2. The system 6 illustrated in FIG. 1 can carry out the method illustrated in FIG. 4.

In a step S20, the field device 1 authenticates itself at the issuer device 3. In this case, the field device 1 sends to the issuer device 3 field device-related information as client-related information. The issuer device 3 creates the authentication information in the JWT format taking account of the field device-related information in such a way that the authentication information is field device-specific. The authentication information additionally comprises the URL of the issuer device 3.

In step S2, already described, the issuer device 3 transmits the authentication information to the field device 1.

Steps S31 to S38 form the TLS handshake 7 between the field device 1 and the server 2. In these steps, the entire data exchange between the field device 1 and the server 2 is carried out by means of the TLS protocol 4.

In a step S31, the field device 1 communicates a "Client Hello" to the server 2. The "Client Hello" contains information about a TLS version and about cipher suites supported by the field device 1.

In a step S32, the server 2 communicates a "Server Hello" to the field device 1, and also a certificate of the server 2 and a server key. The "Server Hello" contains a cipher suite selected by the server 2 and a session identification number.

In step S1, already described, the server 2 transmits an enquiry to the field device 1 for the communication of the authentication information in the JWT format. Furthermore, in a step S33, the server 2 transmits the permissibility list to the field device 1. Steps S1 and S33 are part of the "Server Hello".

In a step S34, the server 2 informs the field device 1 that the "Server Hello" has ended.

In a step S35, the field device 1 selects the JWT which is permissible with the permissibility list being taken into account by the server 2. In step S3, already described, the selected JWT is communicated to the server 2 by means of the TLS protocol 4.

In a step S36, the URL of the issuer device 3 that created the selected JWT is transmitted from the field device 1 to the server 2. Steps S3 and S36 are often carried out together. In a step S37, the field device 1 furthermore communicates a field device key to the server 2.

In a step S38, the server 2 checks the received JWT. In this case, the server checks that the JWT is present in the correct format. If it is determined in step S38 that the JWT is permissible, in step S4, already described, the field device 1 is authenticated by the server 2 and, in step S5, the secure communication channel 5 is set up by means of the TLS protocol between the field device 1 and the server 2.

In a step S39, data are then securely transmitted via the communication channel 5 by means of the TLS protocol.

Figure 5:
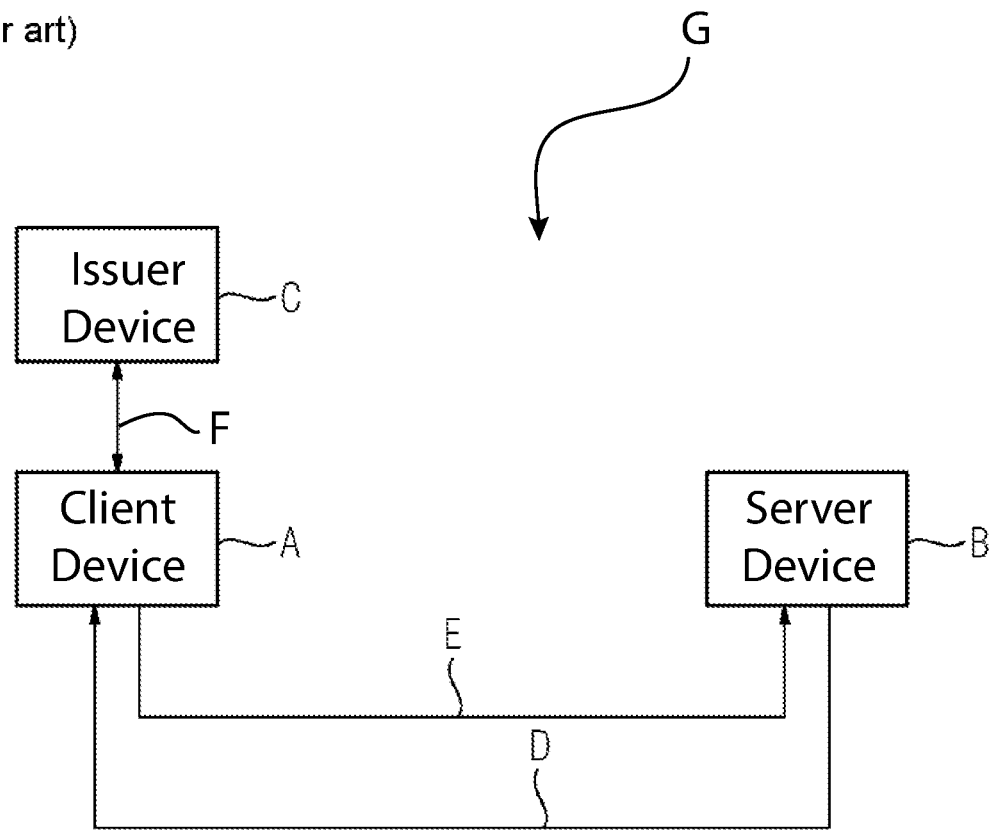
FIG. 5 shows a system from the prior art.

FIG. 5 shows a system G from the prior art. The differences between the system G from the prior art and the system 6 in line with an embodiment from FIG. 1 are highlighted below.

The system G comprises a client device A, a server device B and an issuer device C. In order to authenticate the client device A vis-à-vis the server device B, the server device B requires authentication information from the client device A. Said authentication information is provided to the client device A by the issuer device C.

The authentication of the client device A is carried out as follows in the prior art. Firstly, the server device B sends an enquiry to the client device A by means of a first communication protocol D. The first communication protocol D is the TLS protocol.

The issuer device C provides the client device A with authentication information in the JWT format via a network connection F. Said authentication information is subsequently transmitted by the client device A to the server device B by means of a second communication protocol E. The second communication protocol E is different than the first communication protocol D. The second communication protocol E is an HTTP protocol. The HTTP protocol supports the communication of tokens in the JWT format. In the prior art, tokens in the JWT format cannot be transmitted by means of the TLS protocol because the TLS protocol does not support the JWT format in the prior art.

An HTTP redirect between the server device B and the issuer device C is necessary for utilizing JWTs in HTTP. In the prior art, in contrast to the embodiments from FIGS. 1 to 4, the authentication of the client device is not part of the TLS handshake, or not part of the set-up of the communication channel between the client device and the server device.

Although the present invention has been described on the basis of exemplary embodiments, it is modifiable in diverse ways. By way of example, other cryptographic security protocols, such as the IPsec protocol, can be used as the cryptographic security protocol. The authentication information need not be assigned an issuer device; instead, the authentication information can be assigned e.g. destination server device information, handling information and/or session information. The order of the steps described can be altered. In this regard, step S1 can be carried out after step S2, for example.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. A method for initial setting up of a communication channel for exchanging data between a server device and a client device, comprising:
   creating, by an issuer device, authentication information related to the client device prior to receiving a server inquiry, wherein the issuer device is separate from the client device;
   receiving, by the client device, the server inquiry;
   after receiving the server inquiry by the client device, requesting, by the client device, the authentication information from the issuer device;
   after the requesting by the client device the authentication information from the issuer device, transmitting the authentication information from the issuer device to the client device, wherein the authentication information is a JavaScript Object Notation(JSON) Web Token and wherein the authentication information is not authorization information;
   after the transmitting the authentication information from the issuer device to the client device, transmitting the authentication information from the client device to the server device in a cryptographic security protocol, wherein the cryptographic security protocol is a Transport Layer Security(TLS) handshake protocol having an extension for transmitting the JavaScript Object Notation (JSON) Web Token;
   authenticating the client device by the server device using the cryptographic security protocol including the authentication information, wherein authenticating the client device depends on the transmitted authentication information and depends on an estimation of a reliability of the issuer device and not a reliability of the client device; and
   setting up the communication channel between the server device and the authenticated client device using the cryptographic security protocol including the transmitted authentication information.

2. The method as claimed in claim 1, wherein the authentication information is assigned an issuer device indicating an issuer of the authentication information.

3. The method as claimed in claim 1, which furthermore comprises:
   storing a permissibility list in the client device and/or in the server device, which permissibility list indicates which issuer device from a multiplicity of issuer devices can create authentication information that is permissible for authenticating the client device;
   checking, in the client device or in the server device, whether the issuer device assigned to the authentication information is permissible in accordance with the permissibility list; and
   if the issuer device is permissible in accordance with the permissibility list, authenticating the client device by means of the server device on the basis of the authentication information.

4. The method as claimed in claim 1, wherein the authentication information is assigned destination information indicating destination server device information for which the authentication token is intended; and wherein the method furthermore comprises:
   checking by means of the client device whether the destination server device information corresponds to the server device that communicated the enquiry to the client device; and
   if the destination server device information corresponds to the server device, transmitting the authentication information from the client device to the server device.

5. The method as claimed in claim 1, which furthermore comprises:
   selecting, in the client device, from a multiplicity of items of authentication information an item of authentication information which is assigned an issuer device permissible in accordance with the permissibility list and/or which is assigned destination server device information corresponding to the server device, that asked for the authentication information; and
   transmitting the selected authentication information from the client device to the server device by means of the cryptographic security protocol.

6. The method as claimed in claim 1, which furthermore comprises:
   if the client device is not authenticated by the server device, blocking the set-up of the communication channel between the server device and the client device.

7. The method as claimed in claim 1, which furthermore comprises:
- transmitting client device-related information from the client device to the issuer device; and
- creating the authentication information taking account of the client device-related information in the issuer device.

8. The method as claimed in claim 1, wherein the authentication information comprises at least one item of handling information indicating indications for proper transmission and/or use of the authentication information, and wherein transmitting the authentication information and/or authenticating the client device are/is carried out taking account of the handling information.

9. The method as claimed in claim 1, furthermore comprising:
- storing an issuer device list in the client device, which indicates the issuer devices from which the client device has valid authentication information and/or from which the client device can request authentication information.

10. The method as claimed in claim 1, furthermore comprising:
- requesting the authentication information for the client device by means of the server device by way of the cryptographic security protocol from the client device.

11. The method as claimed in claim 1, wherein the authentication information furthermore contains a session information about a current connection between the client device and the server device.

* * * * *